No. 784,166.

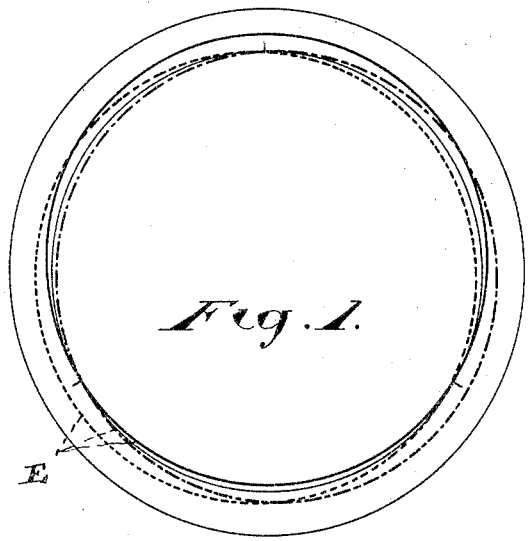
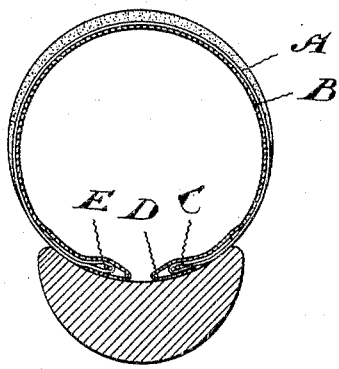
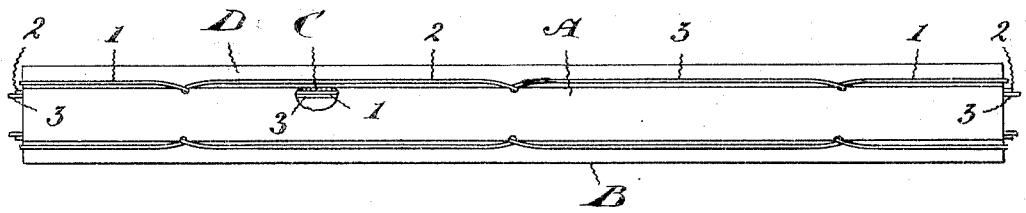
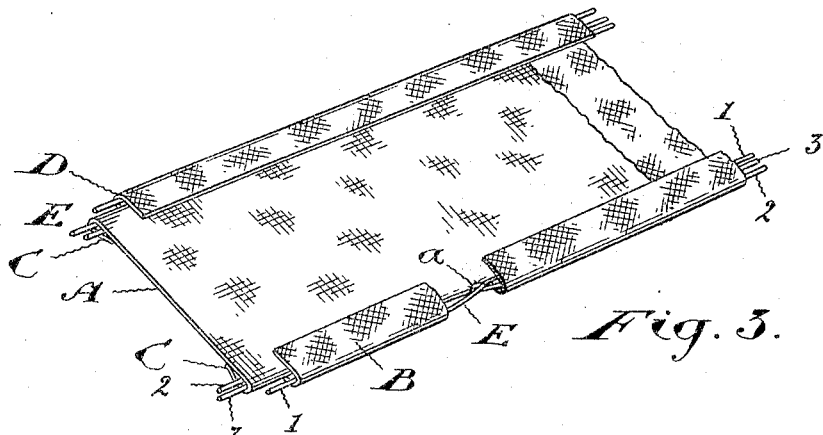

Patented March 7, 1905.

UNITED STATES PATENT OFFICE.

ERNEST LARGE, OF TORONTO, CANADA.

PNEUMATIC TIRE.

SPECIFICATION forming part of Letters Patent No. 784,166, dated March 7, 1905.

Application filed March 12, 1904. Serial No. 197,820.

*To all whom it may concern:*

Be it known that I, ERNEST LARGE, of the city of Toronto, Province of Ontario, Canada, have invented certain new and useful Improvements in Pneumatic Tires, of which the following is a specification.

The object of my invention is to devise means for fastening the cover of a detachable tire on a crescent rim by the action of the air-pressure only; and it consists, essentially, of a cover provided with a pocket in each edge and a plurality of endless wires for each edge, each wire lying partly within the pocket and partly outside, substantially as hereinafter more specifically described and then definitely claimed.

Figure 1 is a diagrammatic side elevation showing the principle of construction of my improved tire. Fig. 2 is a plan view of a cover cut in half and opened out flat. Fig. 3 is an enlarged perspective detail of a portion of the cover. Fig. 4 is a cross-section of a complete tire in position on a crescent rim.

In the drawings like letters of reference indicate corresponding parts in the different figures.

Referring particularly to Figs. 2 and 3, in which the canvas of the tire is shown without the rubber, it will be seen that in constructing my tire I employ two layers of canvas A and B. The canvas A, which is on the outside of the tire, is straight cut, whereas the canvas B is cut on the bias. The edges of the straight-cut canvas are turned under and cemented to form the pockets C, one at each edge of the cover. The canvas B is turned over the canvas A and is cemented down thereto to form the pockets D, one at each edge of the cover. At equal distances around the tire apertures $a$ are formed in the pockets C.

E represents endless wires, in the present case three in number, lying partly in the pockets C and partly in the pockets D, emerging from the pockets C through the apertures $a$. In Fig. 2 I have numbered these wires 1, 2, and 3. The apertures $a$ are three in number and equidistantly spaced. Each wire lies for two-thirds its circumference in the pockets D at the same edge of the tire. (See Figs. 1 and 2.) From this construction it follows that at any given point in the tire there are two wires within any one of the pockets C and one wire within any one of the pockets D.

The principle of the operation of the tire is best illustrated in Fig. 1, in which the pockets D are supposed to be dispensed with. In this view the wires E are further differentiated by one being shown as a full line, another as a dotted line, and a third as a broken line. When a cover provided with wires in its edges, partly inclosed in the pockets and partly outside thereof, is expanded by the introduction between it and the rim of an inflated tube, the edges of the cover tend to blow outwardly and upwardly. As the major portion of any given wire is engaged with a pocket in the rim, this part will be carried outwardly and upwardly with the tire. The remaining portion of the wire being outside the pocket and free will therefore be clamped against the rim at the opposite side of the tire. As a plurality of wires are employed, each engaged with a pocket for the greater portion of its circumference, the same effect takes place with each wire. It will further be noted that the free portions of the wire are so arranged that a practically complete circle of wire is formed around the rim, the parts of which are tightened down upon the rim by the outward movement of the cover carrying with it the portions of the wires within the pockets in its edges. The result of this is that by the force of the expansion of the air a clamping action is secured against the rim to hold the cover in position, and this effect, it will be noticed, is produced without it being necessary that the wires should shift or render in the pockets along their length.

While a useful result may be obtained without the pockets D, yet I prefer to employ them, as shown in Figs. 2, 3, and 4.

It is of course absolutely necessary that the portions of the wires in the pockets D be left free to exercise their clamping action on the rim and must therefore not be carried outwardly and upwardly with the outward and upward movement of the edges of the cover. It is for this reason that the canvas B, in which the pockets D are formed, is bias cut, while the pockets C are formed in the canvas A, which is straight cut. The straight-cut canvas is comparatively non-stretchable transversely, whereas the bias-cut canvas is relatively stretchable. Therefore the pockets C will move outwardly and upwardly with the edges of the tire, whereas the pockets D may stretch to permit the portions of the wires lying within them to be clamped tightly on the rim at a point below and nearer the center than the wires in the pockets C.

As the chief function of the pockets D is to cover the parts of the wires outside the pockets C, if they are large enough or extend sufficiently far in toward the center of the rim when the tire is in use it is not absolutely essential that they be formed of stretchable material, though I find the latter construction preferable.

The outside and tread of the cover is of course made up with rubber in the ordinary manner.

This tire is particularly intended for use with crescent rims, as it furnishes a ready means of attaching a tire to such a rim without the use of cement. A tire is shown in connection with such a rim in Fig. 4.

It will be readily seen that the principle of my invention is substantially that a plurality of endless wires are employed for each edge of a cover, each lying partly in a pocket and partly outside of it, the portion of any wire outside the pocket being preferably equal to a fraction of the whole circumference of the wire whose numerator is one and whose denominator is equal to the number of wires employed on one edge. The invention is also adapted for use with hose-pipe tires in which the cover is continuous instead of being divided circumferentially at the inner side as in what are known as "double-tube" tires.

What I claim as my invention is—

1. In a pneumatic tire a cover having a pocket in each edge in combination with a plurality of endless wires for each edge, each lying partly in said pocket and partly outside it, substantially as described.

2. In a pneumatic tire a cover having a pocket in each edge in combination with a plurality of endless wires for each edge, each lying partly in said pocket and partly outside it; and supplemental pockets of relatively more stretchable material connected with the edges of the cover and containing the parts of the wires outside the main pockets, substantially as described.

3. In a pneumatic tire a cover having a pocket in each edge in combination with a plurality of endless wires for each edge, each lying partly in said pocket and partly outside it, the portion of any wire outside the pocket being expressed by a fraction whose numerator is one and whose denominator is equal to the number of wires employed on one edge, substantially as described.

4. In a pneumatic tire a cover having incorporated therein two layers of canvas, the outer straight cut and the inner bias cut; and a pocket formed at each edge of each layer of canvas in combination with a plurality of endless wires for each edge of the cover, each wire lying partly in the pocket of the straight-cut canvas and partly in the pocket of the bias-cut canvas, suitable apertures being formed in the first-mentioned pocket for the emergence of the wires, substantially as described.

5. In a pneumatic tire a cover having a pocket in each edge in combination with a plurality of endless wires for each edge, each lying partly in said pocket and partly out of it; and supplemental pockets arranged to cover the parts of the wires outside the main pocket and extending in nearer to the center line of the tire when the latter is in use, substantially as described.

Toronto, March 3, 1904.

ERNEST LARGE.

In presence of—
   JOHN G. RIDOUT,
   P. R. JONES.